United States Patent [19]

Polgreen

[11] 4,142,469
[45] Mar. 6, 1979

[54] MAGNETIC SUSPENSION SYSTEM FOR RAILWAY VEHICLE WITH LIFTING FORCE CONTROL

[75] Inventor: Geoffrey R. Polgreen, Wendover, England

[73] Assignee: British Steel Corporation, London, England

[21] Appl. No.: 670,671

[22] Filed: Mar. 26, 1976

[51] Int. Cl.² .............................................. B61B 13/08
[52] U.S. Cl. ...................... 104/148 MS; 104/148 LM
[58] Field of Search ............... 104/148 LM, 148 MS, 104/148 SS; 336/130, 136; 308/10; 310/12, 13

[56] References Cited

U.S. PATENT DOCUMENTS

| | | | |
|---|---|---|---|
| 3,899,979 | 8/1975 | Godsey | 104/148 MS |
| 3,931,767 | 1/1976 | Karch | 104/148 MS X |
| 4,055,123 | 10/1977 | Heidelberg | 104/148 LM |

FOREIGN PATENT DOCUMENTS 1035764  7/1966  United Kingdom ............. 104/148 MS

*Primary Examiner*—Barry L. Kelmachter
*Attorney, Agent, or Firm*—Bacon & Thomas

[57] ABSTRACT

A tracked vehicle system comprises a track having a downwardly facing surface of magnetic material, and a vehicle movable along the track, the vehicle comprising a magnetic suspension system including a permanent magnet, the suspension system being arranged to be magnetically attracted upwardly towards the surface of the track by the flux of the magnet whereby the weight of the vehicle is at least partially balanced by the magnetic force between the magnet and the track, and a magnetic circuit for controlling the magnetic flux, without permanently reducing the magnetic strength of the magnet, whereby to control the lifting force.

11 Claims, 5 Drawing Figures

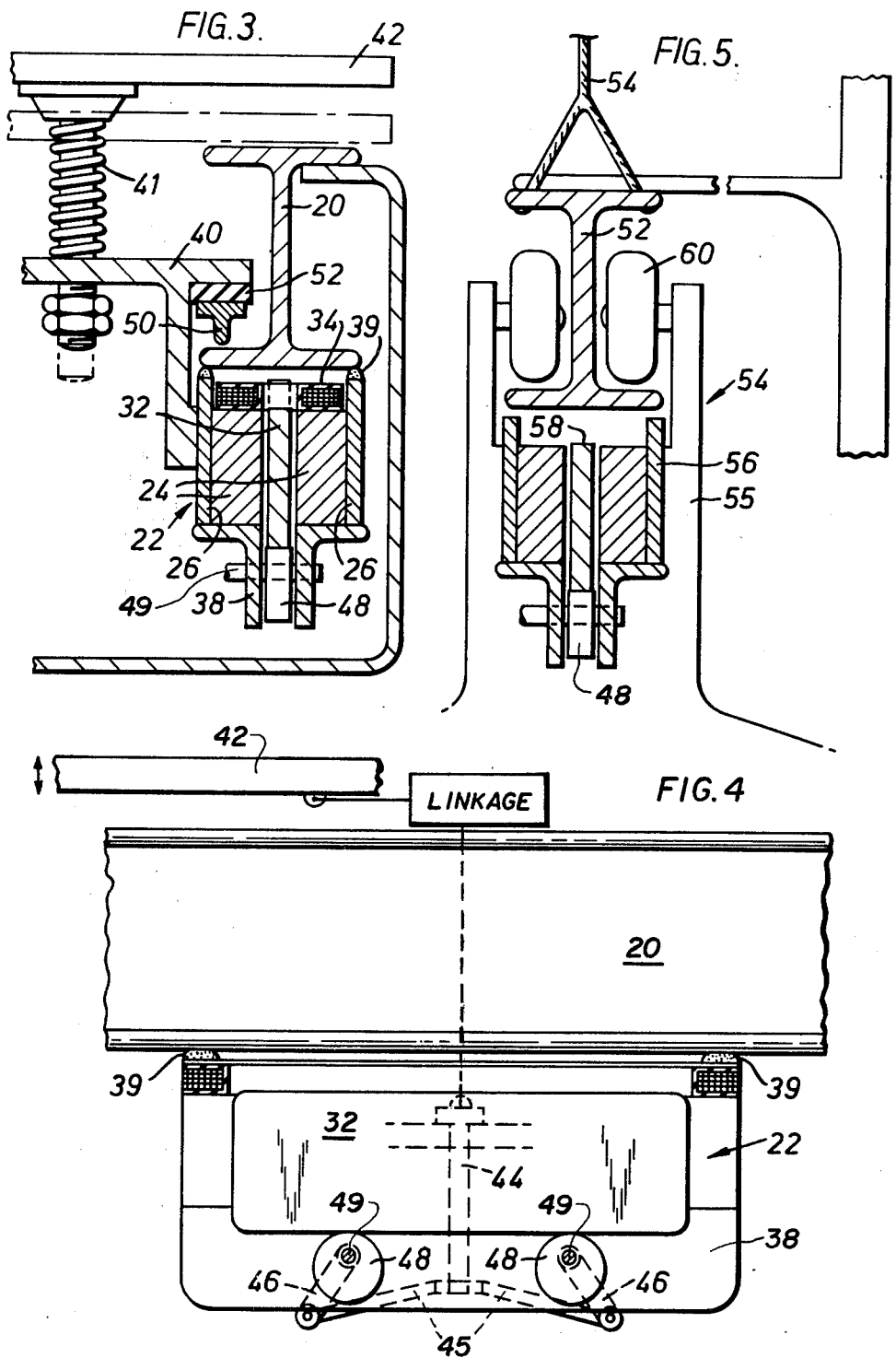

MAGNETIC SUSPENSION SYSTEM FOR RAILWAY VEHICLE WITH LIFTING FORCE CONTROL

The present invention relates to tracked vehicle systems, and more particularly to vehicle systems in which vehicles are magnetically suspended in relation to a track.

Tracked vehicle systems incorporating magnetically suspended vehicles have been proposed in British Patent Specification Nos. 867,045, 1,035,764 and 1,213,997. In these previously proposed systems, high-coercivity permanent ferrite magnets are placed along the entire length of the track in the form of continuous rows of ferrite bricks, and are mounted on every vehicle whereby the vehicles are suspended by repulsion between the track and vehicle magnets. However, in view of the necessity of arranging the magnets along the length of the track, the capital costs of these previously proposed systems are very high.

According to the present invention, there is provided a tracked vehicle system comprising a track having a downwardly facing surface of magnetic material, and a vehicle movable along the track, said vehicle comprising a magnetic suspension system including a permanent magnet, said suspension system being arranged to be magnetically attracted upwardly towards the said surface of the track by the flux of the magnet whereby the weight of the vehicle is at least partially balanced by the magnetic force between the magnet and the track, and means for controlling the magnetic flux, without permanently reducing the magnetic strength of the magnet, whereby to control the lifting force.

Further according to the present invention, there is provided a tracked vehicle system comprising a track of magnetic material having a downwardly facing surface, and a vehicle movable along the track, said vehicle comprising a magnetic suspension system arranged to lift the vehicle relative to the track with a force substantially equal to the weight of the vehicle, said magnetic suspension system including at least one permanent magnet, pole pieces so disposed in relation to the or each magnet that a magnetic circuit is formed between the or each magnet and the said surface of the track through the pole pieces, and means operative to vary the flux in the circuit without permanently reducing the magnetic strength of the or each magnet, the pole pieces being located beneath the said surface of the track whereby the suspension system is magnetically attracted upwardly towards the said surface.

Still further according to the present invention, there is provided a tracked vehicle system comprising a track of magnetic material having a downwardly facing surface, and a vehicle movable along the tracks, said vehicle comprising a magnetic suspension system arranged to lift the vehicle relative to the track with a force substantially equal to the weight of the vehicle, said magnetic suspension system including at least one permanent magnet, pole pieces having parallel, rectilinear upper edges arranged to lie beneath, and parallel to, the downwardly facing surface of the track, the pole pieces being so disposed in relation to the or each magnet that a magnetic circuit can be formed between the or each magnet and the downwardly facing surface of the track through the associated pole pieces, and means for reducing the magnetic flux in the circuit without permanently reducing the magnetic strength of the or each magnet whereby to control the lift provided by the or each magnet.

Still further according to the present invention, there is provided a tracked vehicle system comprising a track having a downwardly-facing surface of magnetic material, and a vehicle movable along the track, the vehicle comprising a magnetic suspension system arranged to lift the vehicle relative to the track with a force substantially equal to the weight of the vehicle, the suspension system comprising a permanent magnet of a high coercivity magnetic material having a substantially linear demagnetisation curve, the suspension system co-operating with the said surface of the track whereby the suspension system is attracted upwardly towards said surface by the flux of the magnet, and means for varying the magnetic flux of the magnet without permanently reducing the magnetic strength of the magnet, whereby to control the lifting force.

Still further according to the present invention, there is provided a tracked vehicle system comprising a track of magnetic material having a downwardly facing surface, and a vehicle movable along the track, said vehicle comprising a magnetic suspension system arranged to lift the vehicle relative to the track, said magnetic suspension system including at least one permanent magnet, pole pieces so disposed in relation to the or each magnet that a magnetic circuit is formed between the or each magnet and the said surface of the track through the pole pieces, the pole pieces being located beneath the said surface of the track whereby the suspension system is magnetically attracted upwardly towards the said surface, and means operative to move vertically one of the pole pieces relative to another of the pole pieces so as to vary the magnetic flux in the circuit whereby to control the lifting force of the suspension system.

Still further according to the present invention, there is provided a vehicle for movement along a track having a downwardly facing surface of magnetic material, said vehicle comprising a magnetic suspension system including a permanent magnet, said suspension system having an upwardly facing flux-carrying surface arranged, in use of the vehicle, to lie beneath the said surface of the track whereby the suspension system is magnetically attracted upwardly towards the said surface of the track, and means for controlling the magnetic flux, without permanently reducing the magnetic strength of the magnet, whereby to control the lifting force.

Still further according to the present invention, there is provided a vehicle for movement along a track having a downwardly facing surface of magnetic material, and vehicle comprising a magnetic suspension system including at least one permanent magnet, pole pieces associated with the or each said magnet, said pole pieces having upper edges arranged, in use of the vehicle, to lie beneath the said surface of the track whereby a magnetic circuit can be formed between the or each magnet and the said surface of the track through the pole pieces so that the suspension system is magnetically attracted upwardly towards the said surface of the track, and means for moving one of the pole pieces relative to another of the pole pieces so as to vary the magnetic flux in the circuit whereby to control the lifting force.

Embodiments of the invention will now be described, by way of example only, with reference to the accompanying diagrammatic drawings, in which:

FIG. 3 is a cross-section showing another form of vehicle and track;

FIG. 4 is a side elevation of the vehicle and track shown in FIG. 3; and

FIG. 5 is a cross-section showing a further form of vehicle and track.

Figure 1:
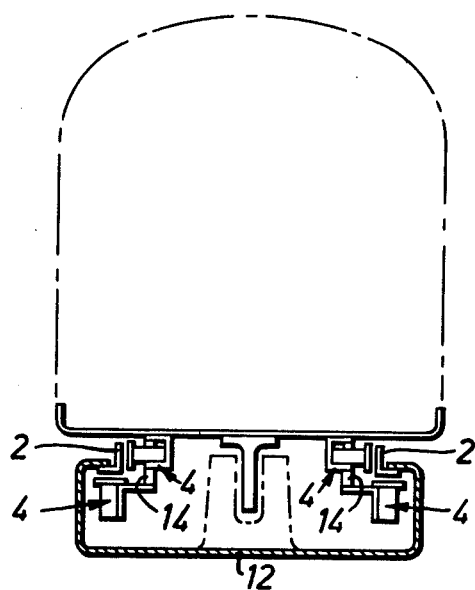
FIG. 1 is a cross-section of a vehicle and track of a system in accordance with the invention.
Figure 2:
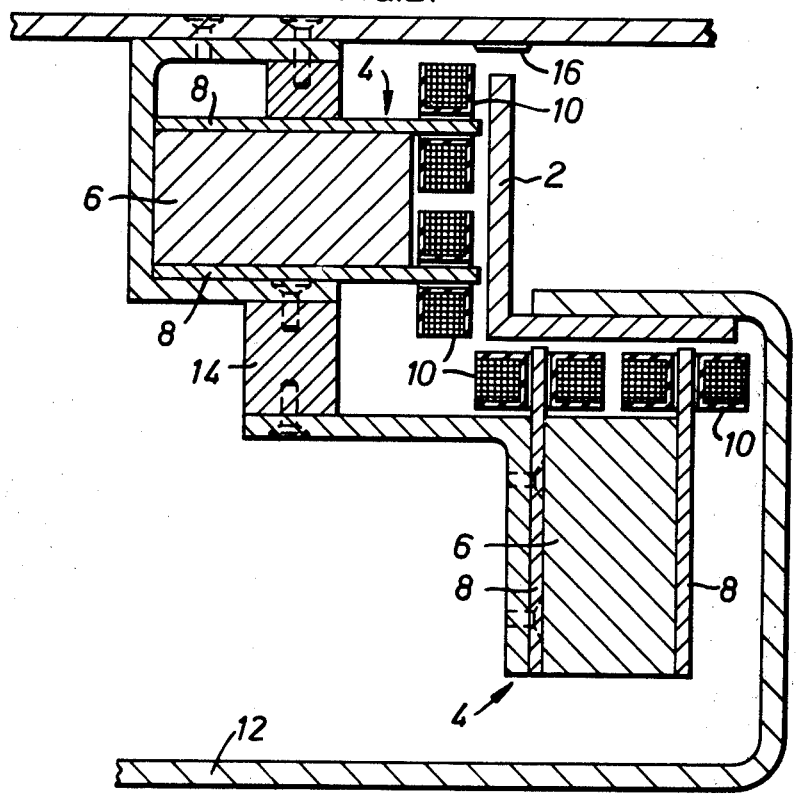
FIG. 2 is a section, to an enlarged scale, of the vehicle and track of FIG. 1.

Generally, the system shown in FIGS. 1 and 2 comprises a track in the form of lightweight steel rails 2 and controlled attraction magnetic rails 4 on each vehicle with limited d.c. power provided to maintain free suspension and guidance in order to eliminate frictional drag and associated wear, noise and vibration.

The controlled-attraction magnetic rails 4 on each vehicle comprise a row of ferrite brick-magnets 6, a pole piece in the form of mild steel strip 8 of appropriate thickness to carry the flux being associated with each pole of the row of magnets 6; both pole pieces extend beyond the magnets 6 on the side which supports the load, the rectilinear upper edges of the pole pieces 8 defining an upwardly facing flux carrying surface of the rails 4. On these two extensions are wound similar coils 10 suitably of anodised aluminium strip about 10 millimeters wide. The rails 4 can comprise a large number of adjacent bricks and the coils 10 can be elongate and may be up to about a meter in length. Thus a magnetic circuit is formed between each magnet 6 and the track through the pole pieces 8, and the flux in the circuit can be varied by passing a current through the coils 10 without permanently reducing the strength of the magnets 6. Direct current passed through the coils 10 in a direction to diminish the flux density can be used to temporarily reduce the flux density to zero or even to partially reverse it. If the current direction is reversed, the permanent concentrated flux can be greatly increased to provide about double the force of the magnets 6 alone. Thus a very wide range of control can be applied to the magnetic rails 4. In effect, the magnetic rails 4 constitute controlled permanent lifting magnets as described in connection with FIGS. 1 to 3 of British Patent Specification No. 1,272,488. The rails 4 can be formed in standard lengths suitably articulated. The magnets 6 of the controlled-attraction magnetic rails 4 on each vehicle provide a greater lifting force than that needed to support the vehicles when loaded so that they are normally held against the track when no control current is flowing. Current passed in a direction to reduce the flux density can be adjusted to balance the lifting force with the instantaneous weight of the vehicle.

With such an arrangement energy is used only for control or for generating movement, the permanent flux providing the static force for load-supporting or suspension without energy dissipation or heating. The ferrite magnets and pole pieces form together an efficient heat sink and small control coils can be used with high current density for control purposes.

The rails 2 are in the form of laterally spaced bright mild steel angle girders orientated so that one limb extends horizontally, and the other limb extends vertically; the vertical limbs lie inwardly of the horizontal limbs. The girders are connected at frequent intervals by steel sleepers 12 shaped to enclose a space for free passage of the magnetic rails 4. Suitably, the sleepers 12 can be used to support power and control cables and light steel cables when the spans of the track are relatively long. The track assembly should be rigid in each plane, and this may be achieved by providing a span weight approximately equal to the loaded train weight, when load in the train is similar to the weight of an empty train.

A respective magnetic rail 4 is associated with each limb of the rails 2; a magnetic rail 4 lies beneath the downwardly facing surface each horizontal limb of the rails 2 to provide the lifting force and a magnetic rail 4 lies adjacent the inner surface of each vertical limb of the rails 2 to provide a guidance force, the upper edges of the pole pieces of the lifting rail 4 being rectilinear and parallel with the downwardly facing surface of the horizontal limb of the rail 2. The two magnetic rails 4 associated with each rail 2 are connected by a structure 14 of non-magnetic material, suitably aluminium alloy; the adjacent parts of the vehicle also comprise a non-magnetic material.

To prevent contact of the steel pole pieces on the vehicle with the steel track, flat strips of bearing bronze can be mounted on the pole pieces to form linear bearings which will also serve to limit the control current range.

The construction of magnetic rail 4 with one magnetic circuit and two control coils 10 as shown in FIG. 2 gives best results for systems operating with larger airgaps, but an alternative construction using a twin-magnetic circuit having a central poleplate wound with only one control coil (as described in FIGS. 4 to 6 of British Patent Specification No. 1,272,488) is feasible in applications where small airgaps are practicable. Such arrangement will be described hereinafter with reference to FIGS. 3 and 4 which show a medium or low-speed system.

The two guidance magnetic rails 4 located adjacent the vertical limbs of the rails 2 have their control coils 10 with series connection in magnetic opposition so that direct current will increase the attractive force of one and decrease the attractive force of the other at the same time. When the vehicle is central relative to the track no control current flows but deviation on either side can be utilised to automatically switch on the control current to provide suitable restoring forces. Such switching can be effected by contacts on the vehicle closing a circuit through the track. The restoring force will be sufficient to counter strong side-winds but linear bearings on the pole pieces will ensure additional protection.

Similarly, the control coils 10 of the two magnetic rails 4 located beneath the horizontal limbs of the rails and providing the lifting force, can be automatically fed with the appropriate direct current to maintain the required airgap for free movement along the track, either together or individually, by contacts which close and open with the vertical movement of the vehicle relative to the track. If the gap becomes too great it can be restored by temporary reversal of current which is normally used to reduce the permanent value, and further fall of the vehicle is limited by its floor or chassis coming into contact with the top edges of the rails 2 through linear bearings 16 as shown in FIG. 2. Thus, while in the normal uncontrolled condition of the magnetic rails 4 the vehicle is held against the rails by the permanent magnet flux, these added precautions against falling and power failure would bring the vehicle safely to rest with acceptable deceleration.

Any kind of electric motor can be used in linear form to propel the vehicle; such a motor may comprise one enrgy-consuming or active part and one passive part if use is made of permanent excitation with the same kind of ferrite magnets as for suspension. If the passive part is installed along each vehicle and the active part on the track, the necessary propulsion-braking forces can be transferred from the track to the vehicles without sliding contacts or other physical connection and thus without noise and wear. The only power then required on the vehicles is that for services such as lighting and magnet control which can suitably be provided by a battery carried by the vehicles; alternatively this power could be transferred from the track by sufficiently small sliding contacts so that wear and noise would be negligible. Other types of propulsion systems can alternatively be used to propel the vehicle.

For slow speed systems the vehicles need only comprise a platform but for higher speed systems the vehicles can comprise railway type coaches with seats for passengers or can comprise empty coaches for carrying passengers seated in automobiles. Trains comprising several vehicles can be used for the very high speed systems with linear induction motor propulsion, the reaction rail being mounted centrally under the vehicle floor along the entire train length. The active part can then be installed intermittently along the track at distances slightly less than the train length; for a high overhead track these can best be fixed at the top of the support towers so that their weight does not encumber either vehicle or lightweight track. Thus relatively long spans of suspension-bridge type can be used to advantage requiring very little ground when supported by cylindrical towers. Medium speed systems can be installed at a lower level and can be propelled by d.c. propulsion with driver operation from the vehicle with linear propulsion from the track in addition.

The system shown in FIGS. 3 and 4 is suitable for medium and low-speeds and comprises a track formed by two I-section steel rails 20 (only one of which is shown) which are spaced by a distance approximately equivalent to the gauge of conventional railway track; the rails are however about one-fifth of the weight per unit length of the rails used in conventional railway track.

The vehicle in this system has controlled-attraction magnetic rails 22 located beneath the downwardly facing surfaces of the lower flanges of the rails 20. Each magnetic rail 22 comprises two elongate parallel magnets 24 disposed between outer pole pieces 26 in the form of elongate, parallel, mild steel plates. The magnets 24 are preferably made from high coercivity ferrite, e.g. "Feroba III" in the form of bricks, or from plastics-bonded ferrite strip. A central pole piece 32 likewise in the form of an elongate mild steel plate, is interposed between the magnets 24 and extends parallel to the outer pole pieces 26. The magnets 24 are so arranged that, in each magnetic rail the same pole lies adjacent the central pole piece 32.

The upper end portions of the pole pieces 26, 32 extend above the upper surface of the magnets 24, a coil 34 being disposed around the upper end portion of the central pole piece 32. The coil 34 is connected to a d.c. pulse generator (not shown); current passes through the coil in one direction will tend to diminish the flux density and current passed through the coil 34 in the reverse direction will tend to increase the flux density.

The outer pole pieces 26 are secured together by a housing 38 of aluminium or other non-magnetic material.

The central pole piece 32 is movable relative to the outer pole pieces 26 whereby the upper edge of the central pole piece 32 can be lowered with respect to the upper edges of the outer pole pieces so as to reduce the magnetic flux, and thus vary the lift provided by the magnetic rail.

Linear bearings 39, preferably of the porous bronze self-lubricating kind, are mounted at the ends of each magnetic rail 22 so that an airgap of about one millimeter is provided between the upper edges of the outer pole pieces 26 and the under surface of the steel rail 20. When the central pole piece 32 is in its uppermost position, the lift is about one-third that of the same equipment with no airgap; a maximum lift of about one ton/meter per rail can be provided and this can be reduced to about one-tenth when the central pole piece 32 is in its lowermost position.

In this low or medium-speed system, the lateral forces acting on the vehicle will be low in comparison with the maximum lifting forces with the result that the magnetic rail will also act to guide the vehicle, thus obviating the need for a separate guidance magnetic rail.

In a low-speed system of the moving platform/roadway type, the load carried by the vehicle may be several times the vehicle weight and will vary considerably, with the result that constant adjustment of the lift provided to counteract the load will be required. Such adjustment is preferably effected automatically by moving the central pole piece 32 as will now be described.

The magnetic rails 22 are mounted on a chassis member 40 which supports, via compression springs 41, a load-carrying platform 42; as will be apparent, the distance between the platform 42 and the chassis member 40 will be reduced with increasing loads. A linkage shown schematically in FIGS. 4 is operative to convert downwards movement of the platform 42 relative to the chassis member 40 into corresponding upwards movement of a rod 44 mounted in the chassis member 40.

The rod 44 is linked by members 45 with a pair of levers 46 each fast with a respective cam 48 journalled at 49 in the housing 38, and engaging the lower edge of the central pole piece 32. Movement of the rod 44 upwardly is operative to cause simultaneous rotation of the cams 48 in a sense to raise the central pole piece 32 and thus to increase the lift provided by the magnetic rail; the cams 48 ensure that the upper edge of the central pole piece 32 remains parallel to the upper edges of the outer pole pieces 26.

The upper (i.e. maximum lift) position of the central pole 32 is shown in dotted lines in FIG. 3. Free movement along the track will depend upon the accuracy of the balance between the lifting forces and the load, but a resultant upwards force is preferable in order to maintain the bearings on the magnetic rail in light physical contact with the undersurface of the lower flange of the rail 20.

The chassis member 40 carries a pair of T-sectioned bronze rails 50, each arranged to lie above the upper surface of the lower flange of a respective rail 20. The vertical limb of each rail 50 is directed downwardly towards the lower flange of the rail 20, and a rubber or other resilient strip 52 is interposed between the cross member of the rail 50 and the underside of the chassis member 40. If, in the event of an overload or of an irregularity in the track, the vehicle tends to fall, the rails 50 come into contact with the rails 20. Lift can be increased by further upwards movement of the central pole piece 32; preferably however, the lift is increased by passing a d.c. pulse of appropriate amplitude through the coil 34 in a sense to increase the flux density. The current can be supplied from a battery carried by the vehicle and can be switched-on automatically whenever the rails 50 contact the rails 20.

The system shown in FIG. 5 is a suspended monorail system. The track is in the form of an I-sectioned rail 52 supported by vertical wires 54 from a cantenary system (not shown). The cantenary system is carried by towers arranged at intervals along the track and lateral support for the rail is provided at each tower.

The monorail vehicle is supported from the track by a suspension unit 54 comprising a frame 55 carrying a magnetic rail 56 similar to the rail 22 of FIGS. 3 and 4. The central pole piece 58 of the rail 56 is moved by a cam/lever system likewise similar to that of FIGS. 3 and 4 whereby the lift provided by the rail 56 is dependent on the load carried by the vehicle. Although as shown, there is no coil provided around the central pole piece 58, such a coil can be provided if desired.

The frame 55 also carries a pair of wheels 60 which lie above the upper surface of the lower flange of the rail 52 and normally lie out of contact with the rail 52. In the case of an emergency, however, the wheels 60 would contact the rail 52 and would carry a load equivalent to the difference between the weight of the vehicle and the lift provided by the magnetic rail 56. Preferably the wheels 60 are formed of nylon.

Traction for the vehicle can be provided by an electric motor driving a rubber covered or other suitable wheel engaging the upper surface of the lower flange of the rail 52. Power and signal cables can be installed along the top of the rail and sliding contacts carried by the frame 55 can engage conductor strips extending along the undersurface of the upper flange of the rail 52.

The magnetic rail 56 provides a magnetic force over the width of the rail 52 thus providing lateral stability for the vehicle.

If desired lateral guidance means can be provided for the vehicle.

In the embodiments particularly described, the magnetic rails incorporate ferrite magnets. Preferably the ferrite used is high-coercivity anisotropic barium/strontium ferrite. However, rare earth/cobalt magnets and other high-coercivity permanent magnets having a substantially linear demagnetisation curve can alternatively be used.

Thus, in contrast to all power-levitation systems which have to be fitted with additional fail-safe equipment to combat possible failure of power and associated equipment, the systems described provide inherently safe vehicles which cannot normally be derailed; their maintenance is moreover negligible with no major moving parts and simple d.c. control.

The systems described are suitably overhead transporation systems for use over cities and other congested areas. The track being of open construction, does not obstruct daylight and can be of sufficiently light weight to install above high buildings at relatively low cost.

The systems described are advantageous in relation to the previously proposed systems using magnet repulsion methods in that the necessity for placing permanent magnets along the entire length of the track is obviated, and a limited amount of d.c. energy can be used to obtain free suspension of the vehicle without the necessity of physical contact with the track, which contact was formerly essential for guidance.

Present electric railways and power-levitated alternatives designed to operate at relatively high speeds suffer from a great disadvantage in that there is an upper speed limit of the vehicles in the region of 300 km/h because of the need to transfer large quantities of power from the track at speed by sliding contacts; such a speed limitation is obviated in the system described with reference to FIGS. 1 and 2. By installing fixed linear induction motors at train-length intervals along the track the time of operation per train is only about one second so the construction can be based on pulse techniques, using high energy intensity in compact units. It is also relatively simple to use three phase equipment at higher frequencies to handle the power levels required to propel the vehicle at very high speeds. In such cases the track will have to be virtually straight and level and this can be achieved with lightweight track installed at considerable height which will be unaffected by ground contour and congestion. For this reason it will be economic to have one track for each route on an automatic spaced shuttle service basis.

We claim:

1. A tracked vehicle magnetic suspension system arranged to lift the vehicle relative to a track having a downwardly facing surface of magnetic material along which the vehicle is movable, the system including at least one permanent magnet, at least two pole pieces of said at least one permanent magnet suitably disposed in relation to said at least one permanent magnet to enable a magnetic circuit to be formed between said at least one permanent magnet and the surface of said track through said pole pieces, at least one of said pole pieces being movable relative to at least one other of said pole pieces in directions towards and away from the track so as to be capable of varying the flux in the magnetic circuit without permanently reducing the magnetic strength of said at least one permanent magnet, and means for moving each said at least one movable pole piece relative to said at least one other of said pole pieces and the track.

2. The apparatus recited in claim 1 wherein the pole pieces are located beneath the downardly facing surface of the track.

3. The apparatus recited in claim 1 including a selectively energizeable coil, and at least one of said pole pieces being magnetically coupled to said coil, the energization of the coil varying the flux in the magnetic circuit without permanently reducing the magnetic strength of said at least one permanent magnet.

4. The apparatus recited in claim 3 wherein the coil is disposed about said at least one movable pole piece whereby the flux in said at least one moveable pole piece is reduced when the coil is energized.

5. The apparatus recited in claim 1 including two permanent magnets arranged in laterally spaced relationship with like poles adjacent; three pole pieces for forming said magnetic circuit between the magnets and the track surface, one of the pole pieces being relatively moveable with respect to the other pole pieces to vary the flux in the magnetic circuit, the moveable pole piece being interposed between the magnets between said like poles and the other pole pieces being located adjacent the opposite poles of each magnet.

6. The apparatus recited in claim 5 wherein each pole piece is in the form of an elongate plate and the magnets extend parallel to each other.

7. The apparatus recited in claim 1 wherein said means for moving each said movable pole piece is responsive to the weight of the vehicle.

8. The apparatus recited in claim 1 wherein the vehicle includes a load carrying member that is movable relative to that part of the suspension system supporting said at least one permanent magnet in proportion to the weight of the vehicle, and said means for moving each said at least one movable pole piece relative to said at least one other of said pole pieces and the track surface comprises means responsive to the relative position of the load carrying member and that part of the suspension system supporting said at least one permanent magnet.

9. The apparatus recited in claim 6 wherein said vehicle includes a load carrying member that is moveable relative to that part of the suspension system supporting said permanent magnets in proportion to the weight of the vehicle and said means for moving said at least one moveable pole piece relative to said other pole pieces and the track surface comprises means for moving said moveable pole piece in a plane that is parallel to said other pole pieces in response to the relative position of the load carrying member and that part of the suspension system supporting said permanent magnets.

10. The apparatus recited in claim 5 wherein said vehicle includes a load carrying member that is moveable relative to that part of the suspension system supporting said permanent magnets in proportion to the weight of the vehicle, and means for moving said relatively moveable pole piece in response to the relative position of the load carrying member and that part of the suspension system supporting the permanent magnets.

11. The apparatus recited in claim 7, wherein said means for moving each said moveable pole piece in response to the weight of the vehicle comprises a load carrying member located above said at least one permanent magnet.

* * * * *